United States Patent [19]

Fontana et al.

[11] Patent Number: 4,916,189

[45] Date of Patent: Apr. 10, 1990

[54] METHOD FOR THE PREPARATION OF CROSS-LINKED POLYCARBONATES, AND COMPOSITIONS MADE THEREFROM

[75] Inventors: Luca P. Fontana, Clifton Park; Sterling B. Brown, Schenectady, both of N.Y.

[73] Assignee: General Electric Company, Schenectady, N.Y.

[21] Appl. No.: 214,965

[22] Filed: Jul. 5, 1988

[51] Int. Cl.$^4$ .............................................. C08L 69/00
[52] U.S. Cl. .................................. 525/186; 524/502; 525/189; 428/412; 428/413
[58] Field of Search .................... 525/186, 189, 468; 528/370; 524/502

[56] References Cited

U.S. PATENT DOCUMENTS

| | | | |
|---|---|---|---|
| 3,098,056 | 7/1963 | Schnell et al. | 260/42 |
| 3,261,808 | 7/1966 | Schnell et al. | 260/47 |
| 4,701,519 | 10/1987 | Evans et al. | 528/371 |
| 4,746,725 | 5/1988 | Evans et al. | 528/370 |

FOREIGN PATENT DOCUMENTS

| | | |
|---|---|---|
| 3311517 | 10/1984 | Fed. Rep. of Germany . |
| 087537 | 6/1981 | Japan . |

OTHER PUBLICATIONS

*Journal of Paint Technology,* Yoshino et al., vol. 44, No. 564, Jan. 1972, "Preparation of Reactive Polymers From Glycidyl Methacrylate and Their Reactivities", pp. 116–123.

Reactive Monomers, Blemmer G-Versatile Polymer Modifier, Nippon Oil & Fats Co., Ltd. (appears to be product brochure, date unknown), pp. 1,2,20-21.

*Primary Examiner*—Theodore E. Pertilla
*Attorney, Agent, or Firm*—Mary A. Montebello; James C. Davis, Jr.; William H. Pittman

[57] ABSTRACT

An improved method for the preparation of cross-linked polycarbonates is disclosed, comprising the reaction at elevated temperature of a composition containing cyclic carbonate oligomers with at least one polyglycidyl acrylate copolymer formed by the reaction of at least one olefin with a glycidyl acrylate monomer. This invention also includes network polycarbonates wherein the carbonate chains are linked to each other via polyglycidyl acrylate copolymer groups. Further included within the scope of this invention are prepreg compositions which comprise a filler and a mixture of cyclic carbonate oligomers with a polyglycidyl acrylate copolymer.

4 Claims, No Drawings

METHOD FOR THE PREPARATION OF CROSS-LINKED POLYCARBONATES, AND COMPOSITIONS MADE THEREFROM

BACKGROUND OF THE INVENTION

This invention relates to polymer compositions and their preparation, and more particularly to the preparation of cross-linked polycarbonates.

Polycarbonates are a class of well-known, commercially available thermoplastic materials possessing physical and chemical properties which are useful in a wide variety of applications. Some of the notable attributes of polycarbonates include high impact strength and thermal stability, along with good transparency. However, the use of polycarbonates in some applications, e.g., automotive, is limited somewhat because of their relatively poor resistance to various organic solvents and other chemicals. Furthermore, glass transition and heat distortion temperatures for some of the conventional polycarbonates are not high enough to permit reasonable molding cycle times.

One method for correcting these deficiencies involves cross-linking the polycarbonate chains to form thermoset compositions. For example, U. S. Pat. No. 3,098,056 describes the reaction of epoxy resins with linear polycarbonates and hardeners, while U.S. Pat. No. 3,261,808 describes the preparation and cure of polycarbonates containing epoxy end groups. While polycarbonates cross-linked in this manner have better properties than those of polycarbonate alone, these methods may not be suitable for use in some of the more advanced molding techniques. For example, the high melt viscosities of linear polycarbonates make these methods unsuitable for use under reactive processing conditions such as reaction injection molding (RIM).

A recent development in the area of polycarbonates involves cyclic polycarbonate compositions. The preparation and use of cyclic polycarbonates have been previously disclosed in numerous applications filed for inventors on behalf of the assignee of the present invention. For example, these materials are described in U.S. Pat. No. 4,644,053. As described in this and in other references, the cyclic oligomer mixtures have low viscosities and can be simultaneously polymerized and molded upon the application of heat.

Thermoset compositions prepared by reacting cyclic polycarbonate oligomers with polyepoxy compounds are described in application Ser. No. 019,153 of T. Evans et al., filed Feb. 25, 1987, now U.S. Pat. No. 4,746,725, and assigned to the assignee of the present invention. Although various polyepoxides are described in that application, the material of choice is either a triglycidyl isocyanurate or a bis-epoxy-terminated bisphenol A-epichlorohydrin condensate.

While the materials described by T. Evans et al. are suitable for a wide variety of applications, there is continuing interest in developing cross-linked polycarbonates which are thermally stable at high processing temperatures, e.g., above about 280° C.

It is therefore a primary objective of the present invention to provide an improved method for the preparation of highly cross-linked polycarbonates.

It is another objective of this invention to provide a method for preparing cross-linked polycarbonates which are stable at high processing temperatures.

It is a further objective of the present invention to provide a cross-linked polycarbonate preparation method which is amenable to reactive processing conditions such as reaction injection molding.

It is still another objective to provide thermoset polycarbonate compositions characterized by high density cross-linking.

SUMMARY OF THE INVENTION

One aspect of the present invention is an improved method for the preparation of cross-linked polycarbonates, comprising the reaction at elevated temperature of a composition containing cyclic carbonate oligomers, a polycarbonate formation catalyst, and at least one polyglycidyl acrylate copolymer which is the reaction product of A and B, wherein A is at least one glycidyl acrylate monomer, and B is at least one monoethylenically unsaturated monomer free of an epoxy group having a reactivity such that B forms a copolymer with A. This invention also includes polycarbonate compositions which are highly cross-linked through glycidyl acrylate functionalities.

DETAILED DESCRIPTION OF THE INVENTION

As mentioned above, the polyglycidyl acrylate copolymer is the reaction product of A and B. Each A unit is a glycidyl acrylate monomer of the formula

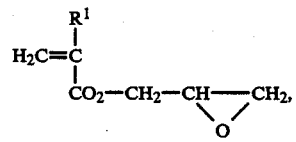

wherein $R^1$ is selected from the group consisting of hydrogen, alkyl groups containing about 1–10 carbon atoms, and aromatic groups containing about 6–20 carbon atoms. Exemplary alkyl groups suitable for $R^1$ are methyl, ethyl, propyl, and isobutyl, while exemplary aromatic groups suitable for $R^1$ include phenyl, tolyl, naphthyl, xylyl, and the like. Methyl (i.e., glycidyl methacrylate) is the most preferred. "Acrylate" as used herein refers to any of the acrylic acid-based groups included in formula I, unless otherwise indicated.

Each B unit in this copolymer is an olefin having a reactivity such that B forms a copolymer with A. In terms of overall process efficiency, olefins or combinations of olefins which provide the highest percentage of copolymer with the glycidyl acrylate monomer are preferred.

Reactivities for the glycidyl acrylates of formula I and for many olefins used to form the B units have been established. For example, when A is derived from glycidyl methacrylate (GMA), olefins for B which have reactivities suitable for copolymer formation include styrene, acrylonitrile, methyl methacrylate, ethyl methacrylate, butyl acrylate, and ethyl acrylate.

For A units other than glycidyl methacrylate and for B units other than the olefins mentioned herein, relative reactivities can be established through simple experimentation by those of ordinary skill in the art, if such values are not readily found in the literature. For example, the monomers in question might be mixed together under reactive conditions, followed by an analysis of the product (monomer, homopolymer, and copolymer content) by well-known analytical techniques, such as solvent extraction of each component, gel permeation chromatography (e.g., separation based on contrasting molecular weights), infrared spectroscopy, nuclear magnetic spectroscopy (NMR), and the like.

Exemplary copolymer compositions useful for this invention are those formed by the reaction of glycidyl methacrylate with styrene; and glycidyl methacrylate with methylmethacrylate.

Exemplary terpolymer compositions for this invention are those formed by the reaction of glycidyl methacrylate with styrene and acrylonitrile; glycidyl methacrylate with methyl methacrylate and acrylonitrile; and glycidyl methacrylate with styrene and methyl methacrylate.

A useful description of the preparation of polymers and copolymers from glycidyl methacrylate is provided by M. Yoshino et al. in the *Journal of Paint Technology*, Volume 44, Number 564, January 1972, pages 116-123. Furthermore, many copolymers suitable for the present invention are commercially available from several sources, including Nippon Oil and Fats Company, Ltd., under the name "Blemmer G" resins. Some of these copolymers are described, for example, in *Blemmer G—Versatile Polymer Modifier*, Revised Edition, Nippon Oil and Fats Company, Ltd., Oil and Fat Products and Chemicals Division.

In preferred embodiments, less than about 50% of the total molecular units in the polyglycidyl acrylate copolymer are A units, since the presence of a greater amount of glycidyl groups can sometimes adversely affect copolymer stability. In particularly preferred embodiments, 20-40% of the total molecular units in the polyglycidyl acrylate copolymer are A units.

The relative amounts of various olefin B units in the copolymer depends on the particular properties desired for the final product. An exemplary copolymer composition contains about 25 to 40 mole percent glycidyl methacrylate and about 40 to about 75 mole percent styrene. Another exemplary composition contains about 30 to 40 mole percent glycidyl methacrylate, about 40 to 65 mole percent styrene, and about 5 to 20 mole percent acrylonitrile. Those of ordinary skill in the art will be able to select particular monomers and monomer ratios to satisfy desired end use requirements without undue experimentation.

The polyglycidyl acrylate copolymers of the present invention are random copolymers, i.e., the comonomers are substantially random in their distribution throughout the polymer chain. Such copolymers may still contain small blocks of homopolymers in the polymer structure in amounts which do not adversely or substantially affect the unique properties of the copolymers. These properties include high reactivity and excellent thermal stability in comparison to some of the other conventional epoxy materials such as triglycidyl isocyanurate or the diglycidyl ethers of bisphenols (e.g., of bisphenol A). The high reactivity generally results in faster and more complete cross-linking of the polycarbonate (as described below), while the thermal stability characteristic results in greater part integrity during and after high temperature molding operations.

As mentioned above, the polyglycidyl acrylate copolymer is reacted with a composition comprising mixtures of cyclic carbonate oligomers according to this invention. Such oligomers are generally characterized by varying degrees of polymerization and comprise structural units of the formula

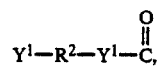
II wherein each $R^2$ is independently a divalent aliphatic, alicyclic or aromatic group, and each $Y^1$ is independently oxygen or sulfur. These oligomers are generally well-known in the art and described, for example, in the following U.S. Patents, all of which are incorporated herein by reference:

| | |
|---|---|
| 4,740,583 | 4,644,053 |
| 4,701,519 | 4,605,731. |

The cyclic carbonate oligomer mixtures (sometimes referred to herein as "cyclics" or "cyclics mixture") of this invention may contain organic carbonate, thiolcarbonate, and/or dithiolcarbonate units. The various $R^2$ groups may be different, but are usually the same, and may be aliphatic, alicyclic, aromatic or mixed. Those which are aliphatic or alicyclic generally contain up to about 8 carbon atoms. Illustrative $R^2$ groups are ethylene, propylene, trimethylene, tetramethylene, hexamethylene, dodecamethylene, 1,4-(2-butenylene), 1,10-(2-ethyldecylene), 1,3-cyclopentylene, 1,3-cyclohexylene, 1,4-cyclohexylene, m-phenylene, p-phenylene, 4,4'-biphenylene, 2,2-bis(4-phenylene)propane, benzene-1,4-dimethylene, and similar groups such as those which correspond to the dihydroxy compounds disclosed by name or formula (generic or specific) in U.S. Pat. No. 4,217,438, the disclosure of which is incorporated by reference herein. Also included are groups containing non-hydrocarbon moieties. These may be substituents such as chloro, nitro, alkoxy and the like, and also linking radicals such as thio, sulfoxy, sulfone, ester, amide, either and carbonyl. Most often, however, all $R^2$ groups are hydrocarbon groups.

Preferably at least about 60%, and more preferably at least about 80%, of the total number of $R^2$ groups in the cyclic oligomer mixtures, and most desirably all of said $R^2$ groups, are aromatic. The aromatic $R^2$ groups preferably have the formula

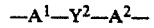
III wherein each of $A^1$ and $A^2$ is a single-ring divalent aromatic group and $Y^2$ is a bridging group in which one or two atoms separate $A^1$ from $A^2$. The free valence bonds in formula III are usually in the meta or para positions of $A^1$ and $A^2$ in relation to $Y^2$. Such $R^2$ groups may be considered as being derived from bisphenols of the formula

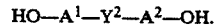
IV

In formulas III and IV, the $A^1$ and $A^2$ groups may be unsubstituted phenylene or substituted derivatives thereof. Exemplary substituents are alkyl, alkenyl, halo (especially chloro and/or bromo), nitro, alkoxy, and the like. In preferred embodiments, both $A^1$ and $A^2$ are preferably p-phenylene.

The bridging group, $Y^2$, is one in which one or two atoms, preferably one, separate $A^1$ from $A^2$. It is most often a hydrocarbon group and, particularly, a saturated group such as methylene, cyclohexylmethylene, 2-[2.2.1]-bicycloheptylmethylene, ethylene, isopropylidene, neopentylidene, and the like. Unsaturated groups and groups containing atoms other than carbon and hydrogen might be used also, such as 2,2-dichloroethylidene, carbonyl, thio, and sulfone.

Other exemplary $R^2$ groups are those derived from dihydroxy compounds such as ethylene glycol, propylene glycol, resorcinol, hydroquinone, 2,2-bis(3,5-dibromo-4-hydroxyphenyl)propane, bis(4-hydroxyphenyl)ether, bis(4-hydroxyphenyl)sulfone, and 6,6'-dihydroxy-3,3,3',3'-tetramethylspiro(bis)indane ("spirobiindane bisphenol").

Based on various considerations such as availability and particular suitability for this invention, the preferred group of formula III is the 2,2-bis(4-phenylene)propane radical, which is derived from bisphenol A.

Furthermore, while the $Y^1$ groups in formula II may be oxygen or sulfur, they are preferably all oxygen.

The cyclic oligomer mixtures usually comprise oligomers having degrees of polymerization of from 2 to about 30, and preferably to about 20. The mixtures sometimes contain very low proportions of linear oligomers, generally no more than about 10% by weight, and most often less than about 5% by weight. The mixtures may also contain low percentages (usually less than 30% by weight and preferably no greater than about 10% by weight) of linear or cyclic polymers having a degree of polymerization greater than about 30.

The particular method of preparing the cyclics mixture is not critical to the present invention; various methods are well-known in the art. One example is preparation via a condensation reaction involving at least one compound selected from the group consisting of bishaloformates and thiol analogs thereof having the formula $$R^2(Y^1\text{—COX})_2, \qquad V$$ 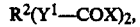

wherein $R^2$ and $Y^1$ are as defined above, and X is chlorine or bromine. The condensation reaction usually takes place interfacially when a solution of the compound in a substantially nonpolar organic liquid is contacted with a tertiary amine such as triethylamine and an aqueous alkali metal hydroxide solution.

The relative amount of cyclic carbonate oligomers to polyglycidyl acrylate copolymer depends in part on the amount of cross-linking desired in the polycarbonate. In preferred embodiments, at least 8 mole percent of glycidyl groups should be used, based on the number of carbonate units in the cyclic carbonate oligomer composition, it being understood that each glycidyl group contains one epoxide group. A preferred upper limit for glycidyl group content is about 25 mole percent, since in some instances, a higher epoxy content could result in very brittle polycarbonates. An especially preferred epoxy level is about 12 mole percent to about 15 mole percent of glycidyl groups, based on the number of carbonate units in the cyclic carbonate oligomer composition.

As mentioned above, a polycarbonate formation catalyst is used to ring-open the cyclic carbonate oligomers. When used, these catalysts also appear to initiate ring-opening of the epoxide groups in the polyglycidyl acrylate. The ring-opened epoxides then react with the polycarbonate to form a cross-linked, thermoset material.

Polycarbonate formation catalysts are known in the art, and are usually various bases and Lewis acids, with bases being preferred for this invention. Some of the polycarbonate formation catalysts useful for this invention are those employed to prepare polycarbonates by the interfacial method and by other techniques, as described in U.S. Pat. Nos. 3,155,683, 3,274,214, 4,217,438, and 4,368,315, each of which is incorporated herein by reference. Examples of such catalysts are lithium phenoxide, lithium 2,2,2-trifluoroethoxide, n-butyl lithium, and tetramethylammonium hydroxide. Also useful are various basic salts such as sodium benzoate and lithium stearate.

A class of bases which is particularly useful under many conditions is described in U.S. Pat. No. 4,605,731. It comprises numerous tetraarylborate salts, including lithium tetraphenylborate, sodium tetraphenylborate, sodium bis(2,2'-biphenylene)borate, potassium tetraphenylborate, tetramethylammonium tetraphenylborate, tetra-n-butylammonium tetraphenylborate, tetramethylphosphonium tetraphenylborate, tetra-n-butylphosphonium tetraphenylborate, and tetraphenylphosphonium tetraphenylborate. The preferred catalysts within this class are the tetra-n-alkylammonium and tetra-n-alkylphosphonium tetraphenylborates. Tetra-n-butylammonium tetraphenylborate is particularly preferred because of its high activity, relatively low cost and ease of preparation from tetra-n-butylammonium hydroxide and an alkali metal tetraphenylborate.

Another class of particularly useful basic catalysts is disclosed in U.S. Pat. No. 4,701,519 of T. Evans et al., the disclosure of which is also incorporated by reference herein. It comprises polymers containing alkali metal phenoxide moieties, especially lithium phenoxide moieties. The moieties are usually present as end groups on the polymer chain, although they can also be present in the polymer chain, or as substituents on the chain. The preferred polymers for these catalysts are polycarbonates, especially linear polycarbonates having a number average molecular weight in the range of about 8,000–20,000, as determined by gel permeation chromatography relative to polystyrene. Such catalysts may be produced by reacting a suitable polymer with an alkali metal base, typically at a temperature in the range of about 200°–300° C.

Lewis acids which may be used as polycarbonate formation catalysts are usually selected from non-halide compounds and include dioctyltin oxide, triethanolaminetitanium isopropoxide, tetra(2-ethylhexyl) titanate and polyvalent metal (especially titanium, nickel, zinc, tin, and aluminum) chelates such as bisisopropoxytitanium bisacetylacetonate (commercially available under the trade name "Tyzor AA") and the bisisopropoxyaluminum salt of ethyl acetoacetate.

For most purposes, the preferred polycarbonate formation catalyst for this invention is a lithium phenoxide-terminated polycarbonate or tetra-n-butylammonium tetraphenylborate.

An effective amount of polycarbonate formation catalyst employed is usually about 0.001–0.5 mole percent, and preferably about 0.05–0.25 mole percent, based on the total number of carbonate units present in the oligomer composition.

In some embodiments, the cyclics mixture, polyglycidyl acrylate copolymer, and polycarbonate formation catalyst can first be mixed together to form a nonpolymerized product, i.e., prior to linearization, polymerization, and cross-linking of the polycarbonate. The components are dissolved in an organic solvent such as methylene chloride, followed by evaporation of the solvent and drying of the residue for about 3 hours to about 15 hours at a temperature of from about 80° C. to about 110° C.

Alternatively, the components may be dissolved in solvent and then sprayed into hot water (usually about 90°–100° C.), followed by filtration and drying of the precipitate.

Formation of the cross-linked polycarbonate is then effected by heating the cyclics/polyglycidyl acrylate copolymer/polycarbonate formation catalyst mixture at an elevated temperature. Suitable temperatures are usually in the range of about 200° C. to 300° C. and, preferably, from about 230° C. to about 275° C.

It should be apparent from the foregoing that another aspect of this invention is a polycarbonate polymer cross-linked through linking groups derived from at least one polyglycidyl acrylate copolymer which comprises glycidyl acrylate-derived units A and olefin units B, wherein A and B are as defined above. The exact cross-linking mechanism is not fully understood, although it appears that the epoxy functionality appears to be the main cross-linking agent, with the ester group of the polyglycidyl acrylate copolymer contributing to a small extent in cross-linking.

Some of the cross-linked polycarbonates of this invention are often additionally characterized by a very high cross-linking density, and can thus be referred to as "network" polycarbonates, which have all of the desirable attributes of thermosetting polymers, such as high strength and solvent resistance, as well as excellent molded part integrity at high temperatures.

As described below, the degree of cross-linking and cross-linking density of compositions of this invention can be measured by two tests which are generally known in the art and further described below: the gel test and the swell test. A gel content of greater than about 80% after prolonged extraction of the polymerized product in methylene chloride indicates that the polycarbonate is substantially cross-linked. In preferred embodiments, the gel content is greater than 90%, and in especially preferred embodiments, is at least 95%.

Furthermore, a network polycarbonate according to this invention is one having a swell test value of less than about 6 times its original weight after immersion in chloroform, as described below.

Compositions formed by the method of this invention may be used in the preparation of a variety of molded, extruded, and cast articles. They may also be used in laminates, and as lacquers, binding agents, and adhesives.

The compositions are especially useful in reactive processing operations such as RIM. In such operations, two liquid streams are fed into a mold where they react to form a resinous article, as described in the above-mentioned T. Evans et al. application, Ser. No. 019,153, incorporated herein by reference. Since polycarbonate formation catalysts which are unreactive with the polyglycidyl acrylate copolymer material can be selected, a molded thermoset article can easily be prepared. For example, a heated mold can be supplied with two liquid streams, one comprising the polyglycidyl acrylate copolymer material, and the other comprising the cyclic polycarbonate oligomer composition and, optionally, a polycarbonate formation catalyst as described above. Alternatively, the catalyst can be sprayed onto the mold walls or, in the case of a composite or prepreg (as mentioned below), may be applied to the filler material. Reaction then takes place in the mold to form the desired article.

The nonpolymerized compositions of this invention, i.e., the cyclic carbonate oligomer composition in admixture with the polyglycidyl acrylate copolymer and the polycarbonate formation catalyst, may be combined with inert filler materials to produce prepreg compositions which can then be polymerized and cross-linked to form thermosetting network polycarbonate compositions having excellent impact resistance, moisture resistance, ductility, solvent resistance, and part integrity (i.e., a part's capability of retaining its exact dimensions after being exposed to high temperature and then being cooled).

Details regarding various aspects of prepreg formation and use are well-known in the art and do not require an exhaustive discussion here. Exemplary techniques are described by Brunelle et al, in U.S. Pat. No. 4,740,583.

Suitable fillers for the prepreg compositions include talc, quartz, wood flour, finely divided carbon, silica, or mixtures thereof. Continuous fiber fillers, including carbon, glass, or highly oriented polyamide or boron fibers, are particularly useful. Polymerization conditions for the prepregs are generally the same as described above. Upon polymerization, reinforced, cross-linked polycarbonate articles are obtained which have a wide range of excellent physical and chemical properties. Furthermore, the presence of the inert filler material advantageously does not affect the degree of cross-linking and network formation.

The following specific examples describe novel embodiments of the present invention and procedures used therein. They are intended for illustrative purposes only, and should not be construed as a limitation upon the broadest aspects of the invention. All parts, percentages, and ratios are by weight, unless otherwise indicated.

EXAMPLES

Gel Test

Polymerized samples or portions of samples were placed in a woven stainless steel screen (200 mesh) and extracted with methylene chloride in a Soxhlet apparatus for 15 hours. Drying and weighing of the samples indicated the amount of insoluble (i.e., gel) material.

Swell Test

The density of cross-linking was measured by a swell test, in which the product extracted from the gel test was dried, weighed, and then dipped in chloroform for 15 minutes, after which the product was weighed again to determine how much chloroform had been absorbed. Less absorbance of chloroform indicates a higher density polycarbonate network, while a greater absorbance of chloroform indicates a lower density polycarbonate network.

Example 1

This example describes one method of preparation of a cross-linked polycarbonate composition according to the present invention. A bisphenol A-derived cyclic carbonate mixture (4.5 grams, 0.018 mole), 50 grams of Blemmer ® G CP50S, which is a polyglycidyl methacrylate/styrene copolymer (50% by weight styrene), and tetrabutylammonium tetraphenylborate (0.025 gram, 0.044 millimole) were dissolved in methylene chloride. The solvent was evaporated and the residue was then dried in a vacuum oven for 15 hours at 80° C.

Polymerization of the sample was then carried out on a 0.5 gram scale in test tubes under a nitrogen atmosphere at about 250° C. to 300° C. for 15 minutes.

An "in mold" polymerization was performed, using a one inch closed circular mold at 275° C.–280° C. (pressure of about 4000–6000 pounds) over the course of 15 minutes.

Example 2

A bisphenol A-based cyclic polycarbonate oligomer mixture was mixed with various polyglycidyl methacrylate copolymers according to the carbonate/glycidyl methacrylate ratios listed in Table 1. The glycidyl methacrylate copolymers of Samples 1–8 fall within the scope of the present invention, and were Blemmer G products of a Nippon Oil and Fats Company, Ltd. The glycidyl methacrylate homopolymer of Sample 9 was obtained from Polyscience Company. Sample 10 utilized triglycidyl isocyanurate (TGIC) as the cross-linking agent, rather than a polyglycidyl acrylate agent of this invention.

The cyclic polycarbonate oligomer mixture contained about 25–30% by weight linear polycarbonate.

The cyclics were mixed with the indicated copolymer or homopolymer, followed by polymerization for 15 minutes at 300° C., using a 0.1% by weight lithium-terminated polycarbonate formation catalyst. In addition to the gel and swell tests, each sample was visually examined to observe the development of any color or foaming that might indicate thermal instability. The results are provided in Table 1 below.

Table 1

Cross-Linking Evaluation for Blends of Polycarbonate Oligomers and Various Glycidyl Methacrylate Copolymers

TABLE 1

| Sample No. | Wt % GMA | Wt %[a] Comonomer(s) | Mole % of glycidyl methacrylate (or TGIC)[b] | % Gel in insoluble fraction | Swell value[c] |
|---|---|---|---|---|---|
| 1 | 10 | 90(S + A) | 15 | 81 | 8 |
| 2 | 15 | 85S | 15 | 96 | 7 |
| 3 | 20 | 80S | 15 | 96 | 6 |
| 4 | 20 | 80(S + A) | 15 | 96 | 6 |
| 5 | 20 | 80(M + A) | 15 | 96 | 6 |
| 6 | 30 | 70S | 15 | 95 | 6 |
| 7 | 50 | 50S | 15 | 98 | 4 |
| 8 | 50 | 50M | 15 | 97 | 4 |
| 9 | 100 | — | 15 | 95 | (d) |
| 10 | — | — | 10 | 88 | 8 |

[a] S = styrene
A = acrylonitrile
M = methylmethacrylate
[b] Based on the total number of moles of bisphenol A carbonate units.
[c] (Weight of sample after chloroform soak) / (Initial weight of sample)
[d] No value obtained.

The data of Example 2 demonstrate that use of the cross-linking agents of this invention generally results in a high level of cross-linking.

Although the polyglycidyl methacrylate homopolymer of Sample 9 exhibited good cross-linking, it was subject to degradation, as described in Example 4 below, and is thus not part of this invention.

The TGIC-based system of Sample 10 (also outside the scope of this invention) did not cross-link as completely as most of the polyglycidyl methacrylate-based systems, and was also found to be more susceptible to degradation at molding temperatures greater than about 280° C.

Example 3

Various products according to this invention were prepared by mixing a cyclic polycarbonate oligomer mixture as used in Example 1 with a polyglycidyl methacrylate copolymer containing 50% by weight glycidyl methacrylate and 50% by weight styrene. The reaction mixture also contained 0.25 mole percent tetrabutylammonium tetraphenylborate as a polycarbonate formation catalyst. As shown in Table 2, the relative percentage of polyglycidyl methacrylate was varied for each sample. The results are provided below:

Table 2

Physical Properties of Various Cross-linked Polycarbonates of this Invention

TABLE 2

Physical Properties of Various Cross-linked Polycarbonates of this Invention

| | Sample No. | | |
|---|---|---|---|
| | 11 | 12 | 13 |
| % PGMA/Styrene Copolymer[a] | 7 | 14 | 20 |
| % Polycarbonate | 93 | 86 | 80 |
| % Gel | 77 | 96 | 95 |
| $T_g$ (°C.) | 149 | 158 | 158 |
| HDT (°C.) (264 psi)[b] | 131 | 145 | 146 |
| Tensile Modulus (psi)[c] | 342,000 | 366,000 | 374,000 |
| % Strain[c] | 6 | 5–6 | 4 |

[a] Copolymer itself contained 50% by wt GMA, 50% by wt styrene.
[b] As measured by ASTM D648.
[c] As measured by ASTM D638.

Each of the samples exhibited acceptable tensile and strain properties. However, the data show that a glycidyl content greater than 7% is generally preferable for inducing cross-linking of the polycarbonates. Furthermore, as the level of polycarbonate is decreased, there is also a decrease in some ductility.

The high tensile modulus properties indicated good part integrity. This is confirmed by aging of the molded sample at 250° C. for 1 hour, followed by examination of the sample for any changes in its dimensions or shape.

Example 4

This example demonstrates some of the disadvantages of using a glycidyl methacrylate homopolymer for the present invention.

Polyglycidyl methacrylate was obtained from the Polyscience Company as a solution (10% by weight) in methyl ethyl ketone. A mixture of bisphenol A-derived cyclic polycarbonates (10.0 grams, 39.4 millimoles) was mixed with the solution of polyglycidyl methacrylate (5.63 grams, 0.394 millimole) and tetramethylammonium tetraphenylborate (22.1 milligrams, 0.04 millimole) in methylene chloride (50 mL). The solvents were evaporated, and the residue was dried in a vacuum oven at 110° C. for 15 hours.

Attempts were made to compression-mold a disk (about one inch (2.54 cm) in diameter, containing about 2 grams of the mixture) at a temperature of 250° C. and a pressure of 4000 pounds. These attempts failed, resulting in excessive foaming and complete degradation of the material. It appears that failure was in part due to the low thermal stability of the glycidyl methacrylate homopolymer.

Example 5

This example describes the preparation of a cross-linked polycarbonate composite article.

An eight ply laminate containing about 70% by weight glass and 25% by weight resin (a mixture of the cyclic polycarbonate material and the polyglycidyl methacrylate-styrene copolymer used in Example 1) was compression-molded.

The mold was placed in the tool piece, and the temperature was raised to 225° C. while the pressure was maintained at 50 psi. After reaching 225° C., the pressure was increased to 200 psi. These conditions were held for 15 minutes to achieve thorough impregnation of the resin into the glass fibers. While maintaining the pressure at 200 psi, the tool temperature was then raised to 280° C. and held there for 10 minutes. After cooling under pressure (200 psi), the part was demolded. A gel test as described above yielded 100% insoluble material, demonstrating that the cross-linking tendency of these compositions is not adversely affected by the presence of filler materials.

Modifications and variations of the present invention might be desirable in light of the above teachings. It is, therefore, to be understood that changes may be made in the particular embodiments of the invention described herein which are within the full intended scope of the invention as defined by the appended claims.

What is claimed is:

1. A prepreg composition comprising a filler and a resinous component which itself comprises a mixture of cyclic carbonate oligomers and at least one polyglycidyl acrylate copolymer which is the reaction product of A and B, wherein A is at least one monomer of the formula

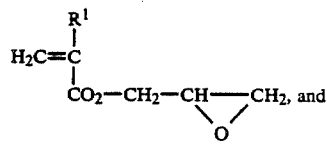

B is at least one monoethylenically unsaturated monomer free of an epoxy group having a reactivity such that B forms a copolymer with A;

and $R^1$ is selected from the group consisting of hydrogen, alkyl groups containing about 1–10 carbon atoms, and aromatic groups containing about 6–20 carbon atoms.

2. The prepreg composition of claim 1 wherein less than about 50% of the total molecular units in the polyglycidyl acrylate copolymer are A units.

3. The prepreg composition of claim 1 further including an effective amount of a polycarbonate formation catalyst.

4. The prepreg composition of claim 1 wherein the filler consists essentially of continuous fibers.

* * * * *